US006154666A

United States Patent [19]
Patterson et al.

[11] Patent Number: 6,154,666
[45] Date of Patent: Nov. 28, 2000

[54] WIRELESS COMMUNICATIONS ASSEMBLY WITH VARIABLE AUDIO CHARACTERISTICS BASED ON AMBIENT ACOUSTIC ENVIRONMENT

[75] Inventors: Gregory S. Patterson, Morrisville; Thomas E. Jazwa; Patrik H. Lilja, both of Cary, all of N.C.

[73] Assignee: Ericsson, Inc., Research Triangle Park, N.C.

[21] Appl. No.: 08/995,428

[22] Filed: Dec. 20, 1997

[51] Int. Cl.[7] .......... H04B 7/05

[52] U.S. Cl. .......... 455/575; 455/238.1; 379/390; 381/57

[58] Field of Search .......... 455/238, 238.1, 455/388, 68, 69, 575, 569, 570; 381/57, 107, 108, 56

[56] References Cited

U.S. PATENT DOCUMENTS

| | | | |
|---|---|---|---|
| 4,829,565 | 5/1989 | Goldberg | 379/390 |
| 5,036,532 | 7/1991 | Metroka et al. | 455/566 |
| 5,170,499 | 12/1992 | Grothause | 455/238.1 |
| 5,367,556 | 11/1994 | Marui et al. | 379/58 |
| 5,448,620 | 9/1995 | Gershkovich et al. | 379/58 |
| 5,450,494 | 9/1995 | Okubo et al. | 381/57 |
| 5,615,256 | 3/1997 | Yamashita | 379/390 |
| 5,642,402 | 6/1997 | Vilmi et al. | 379/58 |
| 5,646,589 | 7/1997 | Murray et al. | 340/384.1 |
| 5,790,671 | 8/1998 | Cooper | 381/57 |
| 5,844,983 | 12/1998 | Lilja . | |
| 5,844,992 | 12/1998 | Boyer | 381/57 |

*Primary Examiner*—Daniel S. Hunter
*Assistant Examiner*—Pablo Tran
*Attorney, Agent, or Firm*—Coats & Bennett, PLLC

[57] ABSTRACT

An environmental sensor distinguishes between a plurality of different ambient acoustic environments and communicates with an audio gain circuit which automatically adjusts the audio characteristics of the speaker and microphone of a wireless communications assembly for more optimum audio performance. The wireless communications assembly preferably includes a hands free adapter coupled to a wireless communications device such as a cellular telephone. The adjustments to the audio characteristics are according to predetermined settings for the identified ambient acoustic environment which are preferably stored in memory associated with the audio gain circuit. In this manner, the audio characteristics are automatically adjusted for the actual ambient acoustic environment that the wireless communications assembly is operating in.

10 Claims, 4 Drawing Sheets

WIRELESS COMMUNICATIONS ASSEMBLY WITH VARIABLE AUDIO CHARACTERISTICS BASED ON AMBIENT ACOUSTIC ENVIRONMENT

FIELD OF THE INVENTION

The present invention relates generally to wireless communications devices, and more particularly to wireless communications devices having variable audio characteristics based on the environment in which the wireless communications device is operating.

BACKGROUND OF THE INVENTION

Wireless communication systems, such as cellular telephone systems, have proved to be very popular. Such systems typically include numerous mobile units (e.g., cellular telephones), a plurality of base stations at fixed locations, and one or more switching centers connecting the wireless communication systems to other communications systems, such as the land line public switched telephone network.

Typically, the mobile units are transportable and designed to function in a variety of ambient acoustic environments. For instance, the mobile units may be designed to function in an office environment or inside a moving vehicle. In addition, various types of hands free adapters have been developed that allow mobile units to operate without being held next to a person's head. Hands free adapters typically include a means for holding the mobile unit, a speaker, a microphone, and associated electronics for amplification. When the mobile unit is coupled to the hands free adapter, any speakers or microphones in the mobile unit are typically disabled and the hands free adapter's speaker and microphone are used instead. Hands free adapters may also contain other electronics such as battery charging circuits.

When a mobile unit is used in conjunction with a hands free adapter, the acoustic environment is different than when the mobile unit is held next to a person's head. For instance, the distance between the microphone and the person's mouth will be longer, as will the distance from the speaker to the person's ear. These longer distances mean that acoustic attenuation plays a larger role in getting the acoustic signals to and from the user. In addition, there is greater chance for undesirable interference from ambient acoustic noise. Further, hands free configurations may allow for an acoustic echo path to be created between the speaker and the microphone.

Typically, modern mobile units are equipped with hands free circuits to adjust for the different acoustic environments encountered when the mobile units are used with hands free adapters. However, many mobile units are designed for optimum performance in one particular environment and are unable to optimally adjust for different ambient acoustic environments. That is, a hands free circuit in the mobile unit may be designed to handle a noisy vehicle-in-motion environment by increasing the audio gain for the speaker and reducing the audio gain for the microphone. However, these adjustments may not be optimum when the mobile unit/hands free adapter combination is in a quieter office environment where a more optimum setting may include decreasing audio gain for the speaker and increasing audio gain for the microphone. Thus, one setting for hands free operation may not be suitable for all ambient acoustic environments.

Most hands free adapters contain circuits which adjust the audio gains for the speaker and the microphone by a fixed predetermined amount. A plurality of hands free adapters may be used, one designed for each ambient acoustic environment, but this increases cost and requires greater user effort.

As such, there is a need for a device for use with wireless communications mobile units that can sense the ambient acoustic environment and adjust the audio characteristics to one of a plurality of different available settings such that the audio characteristics are more optimally adjusted for the actual ambient acoustic environment encountered.

SUMMARY OF THE INVENTION

The present invention utilizes an environmental sensor to distinguish between a plurality of different ambient acoustic environments and automatically adjusts the audio characteristics for more optimum audio performance. In one embodiment, a hands free adapter is coupled to a wireless communications device such as a cellular telephone. The hands free adapter includes a speaker, a microphone, an audio gain circuit, and the environmental sensor. The phone includes a hands free circuit which provides a receive audio signal to the hands free adapter and receives a transmit audio signal from the hands free adapter. Based on the ambient acoustic environment identified by the environmental sensor, the audio gain circuit adjusts the audio characteristics of the speaker and the microphone. These adjustments are according to predetermined settings for that ambient acoustic environment which are preferably stored in memory associated with the audio gain circuit. In this manner, the audio characteristics are automatically adjusted for the actual ambient acoustic environment encountered.

DETAILED DESCRIPTION

Figure 1:
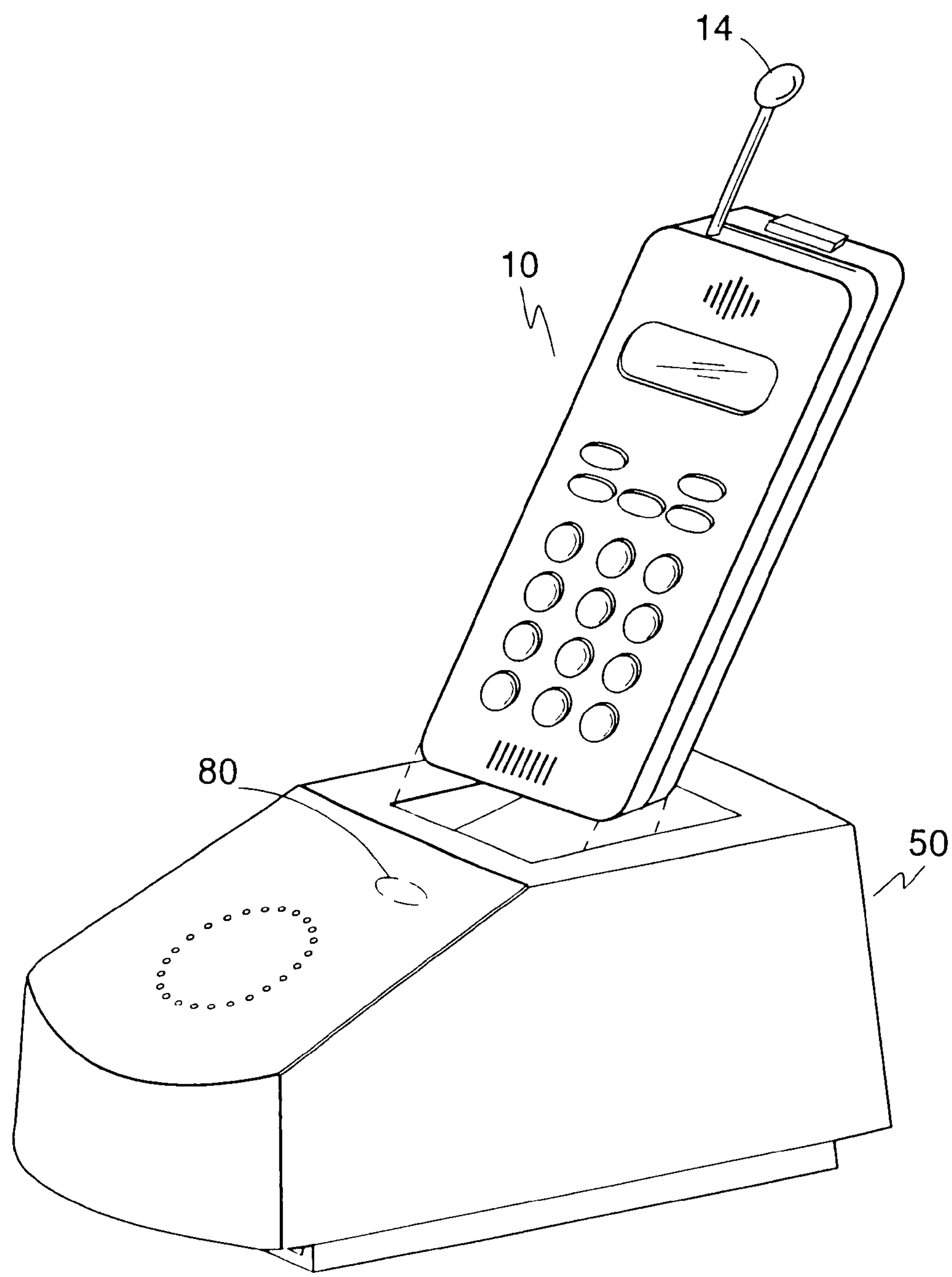
FIG. 1 is a perspective view of the combined phone and hands free adapter of the present invention.

The present invention utilizes an environmental sensor 80 to distinguish between a plurality of different ambient acoustic environments. The environmental sensor 80 communicates with an audio gain circuit 70. Based on the ambient acoustic environment identified by the sensor 80, the audio gain circuit 70 adjusts the audio characteristics of a speaker 54 and a microphone 52 according to predetermined settings for that ambient acoustic environment.

Mobile units 10 in wireless communications systems typically contain various electronics including a transceiver 12 for transmitting and receiving signals via an antenna 14. The details of mobile units 10 are well known in the art and are not necessary for understanding the present invention. In more modern mobile units 10, it is typical for there to be a hands free circuit 20 to allow the mobile unit 10 to be used in conjunction with hands free adapters 50. A hands free circuit 20 typically includes a hands free controller 22 and a transmit attenuator 24 and a receive attenuator 26. The hands free controller 22 controls the operation of the transmit attenuator 24 and the receive attenuator 26. Further, the hands free controller 22 typically causes the mobile unit's speaker and microphone to be disabled during hands free operation; the speaker 54 and microphone 52 in the hands free adapter 50 are used instead. The receive attenuator 26 receives audio signals from the transceiver 12 and attenuates or amplifies the audio signals according to instructions from the hands free controller 22. Likewise, the transmit attenuator 24 receives audio signals from the hands free adapter 50 and attenuates or amplifies the audio signals according to instructions from the hands free controller 22 before sending the audio signals to transceiver 12. The hands free circuit 20 may also contain logic which determines which audio signal path, transmit or receive, is the active path and attenuates the non-active path.

For purposes of illustration, a cellular telephone is used as the mobile unit 10 in the discussion immediately below.

A hands free adapter 50 typically includes a shell 60, a microphone 52, a speaker 54, and a printed circuit board 56 containing suitable electronics. The shell 60 typically includes a cover 62 attached to a base 66. The cover 62 has a cradle recess 64 for accepting the lower part of the phone 10. The cradle recess 64 may hold the phone 10 in either a vertical position or in a tilted position. As is well known in the art, additional means, such as a gripping sleeve (not shown), may be provided to securably, but releasably connect the phone 10 to the hands free adapter 50. Further, internal to the cradle recess 64 are suitable means well known in the art for making electrical contact between the phone 10 and the hands free adapter 50. The lower side of the base 66 may include a plurality of gripping rails 69 for removably securing the hands free adapter 50 to a mount such a vehicle mount. Alternatively, the lower side of the base 66 may simply include a plurality of rubberized gripping feet. Other mounting configurations known in the art may be used and are encompassed hereby.

Figure 4:
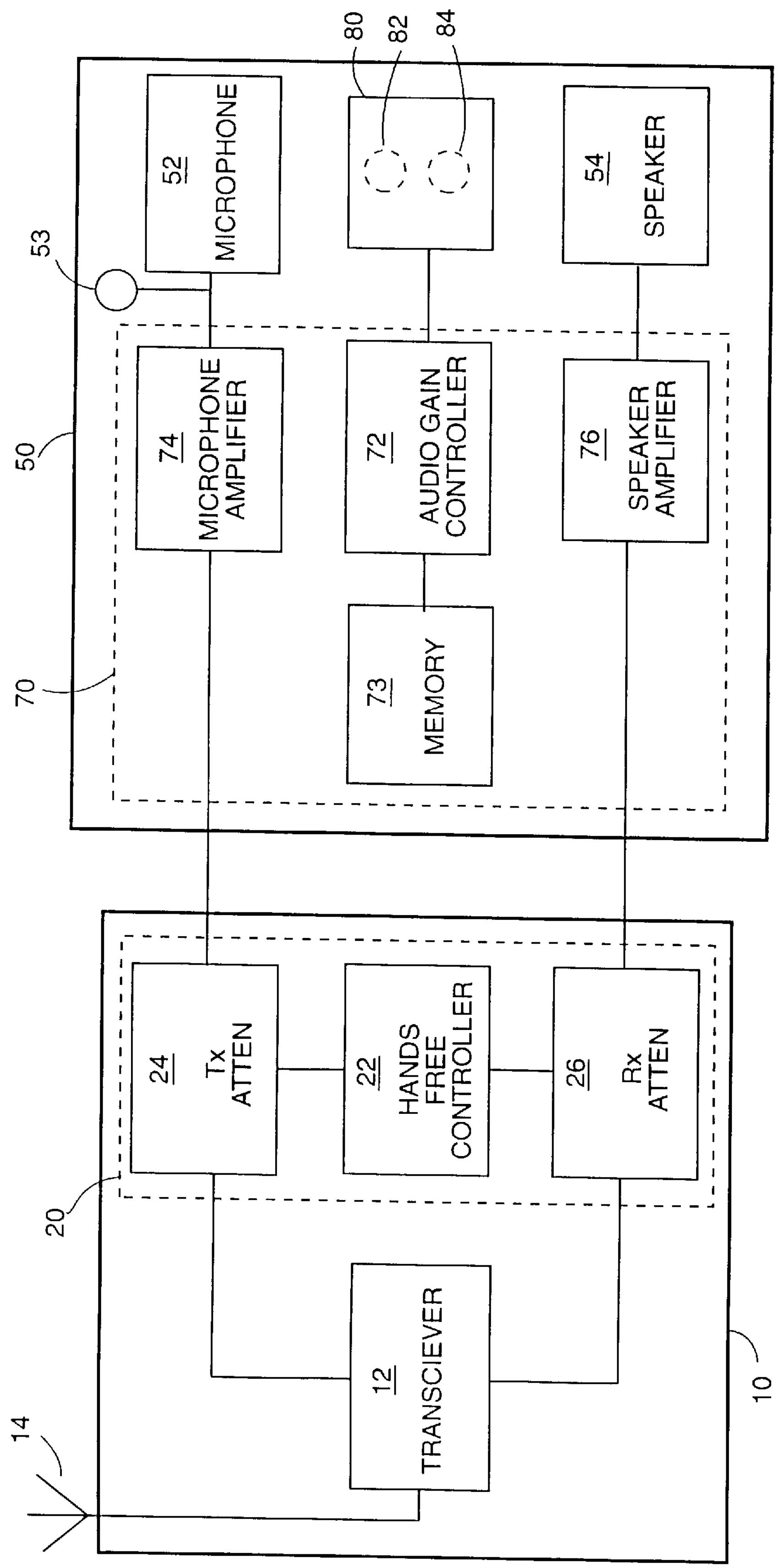
FIG. 4 is a simplified block diagram of the phone and hands free adapter of the present invention.

The shell 60 surrounds the printed circuit board 56 which contains the hands free adapter's electronics. While the hands free adapter 50 may include battery charging circuits, or a wide variety of other circuits known in the art, for purposes of the present invention, the hands free adapter 50 of FIG. 4 includes an audio gain circuit 70. The audio gain circuit 70 includes an audio gain controller 72 which controls the microphone amplifier 74 and the speaker amplifier 76. Associated with the audio gain controller 72 is memory 73 for storing predetermined settings for the microphone amplifier 74 and the speaker amplifier 76. The speaker amplifier 76 amplifies the audio signal for the speaker 54 received from the phone 10 while the microphone amplifier 74 amplifies the audio signal from the microphone 52 to the phone 10. Note that amplification as used herein may be either positive or negative.

An environmental sensor 80 is in communication with the audio gain circuit 70. The environmental sensor 80 distinguishes between different ambient acoustic environments. In one embodiment, the environmental sensor 80 may be a simple acoustic noise detector capable of distinguishing between a plurality of different ambient noise levels. In another embodiment, the environmental sensor 80 may use some other environmental characteristic as a proxy for the ambient acoustic environment. For instance, the environmental sensor 80 may be an electronic circuit which identifies which type of power source is being used. In such an embodiment, one ambient acoustic environment, such an office, may be detected when power is supplied through a first power terminal 82 while another ambient acoustic environment, such as a vehicle environment, may be detected when power is supplied through a second power terminal 84. In another embodiment, the environmental sensor 80 may be a simple switch that it actuated by the user or a simple switch array that detects the orientation of the phone 10 relative to the hands free adapter 50. For instance, a vertically mounted phone 10 would correspond to a first ambient acoustic environment while a tilted phone 10 would correspond to a second ambient acoustic environment.

In another embodiment, the environmental sensor 80 may be a simple switch that detects the mounting method or orientation of the hands free adapter 50. For instance, an optical emitter/detector may be housed in the base 66 above the gripping rails 69 with a reflector mounted to the gripping rails 69. In such an embodiment, an uninterrupted optical beam would correspond to a first ambient acoustic environment (e.g., hands free adapter 50 on office tabletop) while an interrupted optical beam would correspond to a second ambient acoustic environment (e.g., hands free adapter 50 mounted in vehicle). Alternatively, a level switch could be used to identify the orientation of the hands free adapter 50.

While particular physical arrangements of the hands free adapter 50 are described and shown in the figures, the present invention is not limited to these physical arrangements. Any one of a wide variety of physical structures for the hands free adapter 50 is suitable for the invention. All that is necessary is that the combined phone 10 and hands free adapter 50 include an environmental sensor 80, a hands free circuit 20, a speaker 54, a microphone 52, and a audio gain circuit 70.

In operation, the combined phone 10 and hands free adapter 50 function as a single wireless communications assembly. Coded audio signals are received at the transceiver 12 via the antenna 14 and processed by the phone's logic circuits. Because the phone 10 is coupled to the hands free adapter 50, the received audio signal is not sent to the phone's speaker. Instead, the received audio signal is routed to the received signal attenuator portion 26 of the hands free circuit 20. Although this portion of the hands free circuit 20 is called an attenuator, it is understood that such portion may also function as an amplifier. The received signal attenuator 26 amplifies or attenuates the received audio signal by a predetermined level under instruction from the hands free controller 22. The received signal is then routed to the speaker amplifier 76 for further audio gain adjustment.

The environmental sensor 80 identifies the ambient acoustic environment and communicates this identification to the audio gain circuit 70. The audio gain circuit 70, and more particularly the audio gain controller 72, then selects the proper gain settings for the microphone amplifier 74 and the speaker amplifier 76 from a plurality of predetermined settings based on the identified ambient acoustic environment. These predetermined settings are preferably stored in memory 73 for recall by the audio gain controller 72. Any method of recall known in the art may be used such as a look-up table or hardware settings. Based on the recalled settings, the received audio signal is amplified and sent to the speaker 54.

User input to the microphone 52 creates a transmit audio signal at the microphone amplifier 74 which is amplified by the microphone amplifier 74 according to the settings relayed by the audio gain controller 72. The transmit audio signal is then routed to the transmit attenuator 24, where it may be amplified or attenuated, and then on to the transceiver 12 and antenna 14.

In one preferred embodiment, the sum of the audio gain imparted by the microphone amplifier 74 and the audio gain that imparted by the speaker amplifier 76 is a constant. For instance, in a response to the detection of a first ambient acoustic environment, the microphone amplifier 74 may impart a gain of 26 dB while the speaker amplifier 76 may impart an audio gain of 6 dB, but in a response to the detection of a second ambient acoustic environment, the microphone amplifier 74 may impart a gain of only 20 dB while the speaker amplifier 76 may impart an audio gain of 12 dB. Thus, in one preferred embodiment, the net audio gain imparted to both audio paths by the audio gain circuit 70 remains a constant regardless of ambient acoustic environment detected by the environmental sensor 80.

In this manner, the combined phone 10 and hands free adapter 50 may have optimized audio characteristics for each of a plurality of different ambient acoustic environments. That is, the speaker 54 may have optimum volume and the microphone 52 may have optimum pick-up sensitivity. Typically, hands free circuits 20 in phones 10 have only one setting, allowing for only one active level of attenuation or amplification of the received and transmitted audio signals. Such setting may allow for hands free operation, but may not produce optimized audio characteristics for each ambient acoustic environment. By coupling the phone 10 with a hands free adapter 50 having an acoustic environment sensor 80 and an audio gain circuit 70, one of a plurality of audio gain settings may selected which will produce more optimum audio characteristics.

The description above has assumed that the audio gain circuit 70 and environmental sensor 80 are included in the hand free adapter 50. This is one preferred embodiment. However, the audio gain circuit 70 and/or the environmental sensor 80 may instead be included in the phone 10.

Likewise, the microphone 52 and the speaker 54 need not be included in the hands free adapter 50 or the phone 10; both or either may be in a separate unit that plugs into the hands free adapter 50. Of course, the microphone 52 and the speaker 54 must be in communication with the audio gain circuit 70.

Figure 2:
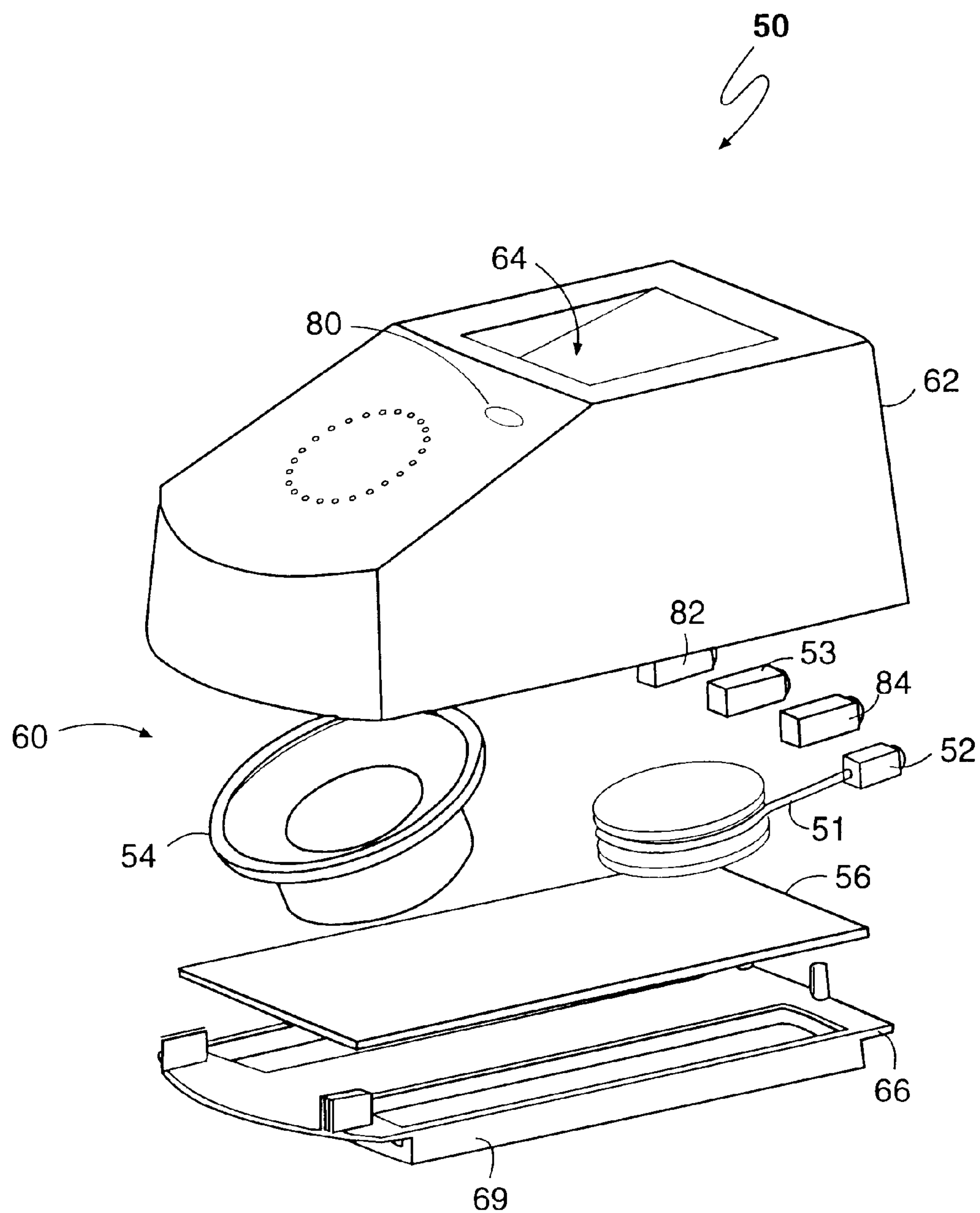
FIG. 2 is a partially exploded view of the hands free adapter of FIG. 1.
Figure 3:
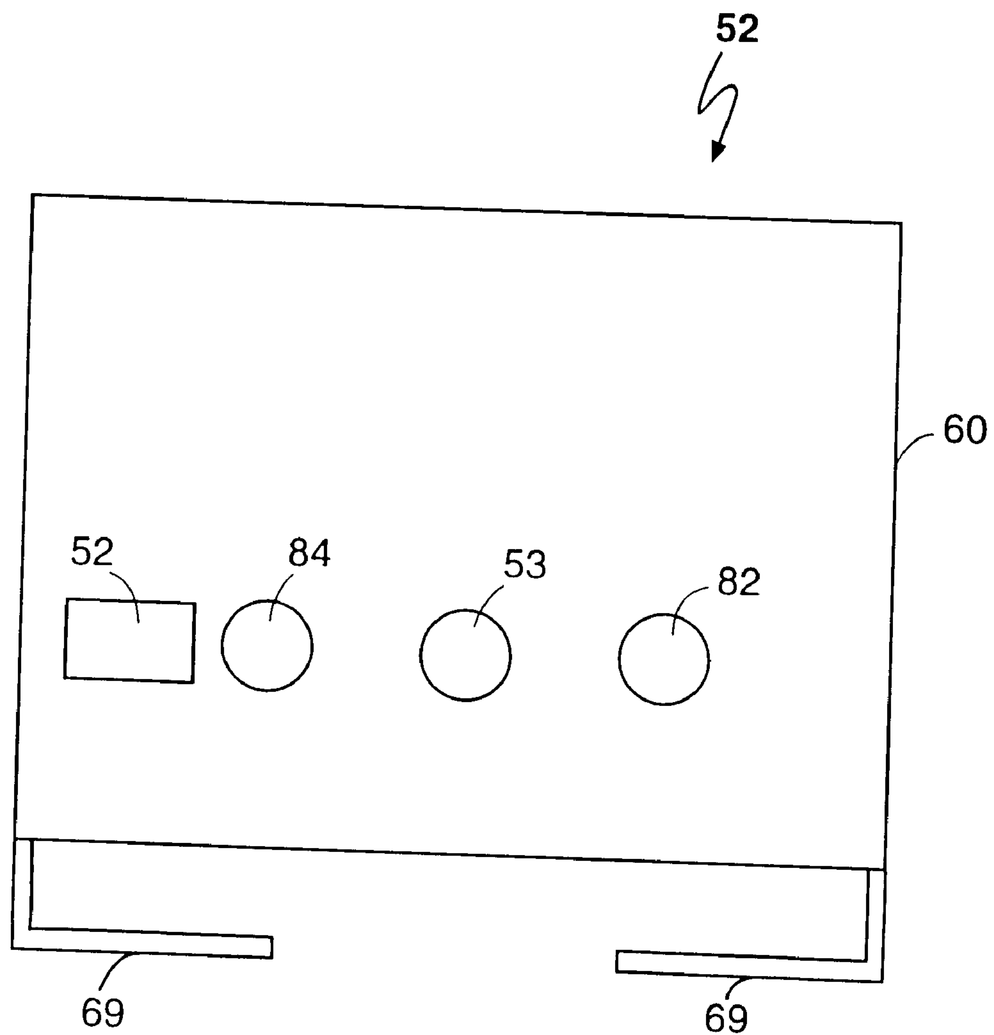
FIG. 3 is a rear view of the hands free adapter of FIG. 1.

Assuming the hands free adapter 50 includes the microphone 52, the microphone 52 may be in a fixed location on the hands free adapter 50. Alternatively, the microphone 52 may be on the end of a retractable cord 51 as shown in FIG. 2. Further, a connection 53 for an external wired or wireless microphone may be provided. Preferably, if the external microphone connection 53 is used, microphone 52 is disabled and the signals from the external microphone replace those from the microphone 52.

As discussed above, the hands free circuit 20 may contain logic which determines which audio signal path, transmit or receive, is the active path and attenuates the non-active path. This determination is based on what is termed the hands free algorithm. Some hands free algorithms also consider the phone volume setting and apply more attenuation to the non-active path as the volume is increased.

In one embodiment, the ambient acoustic environment sensed by the environmental sensor 80 is communicated to the phone 10. Based on this information, the phone 10 may adjust phone dependent settings such as the base volume settings or change additional operational characteristics (other than simply employing the hands free circuit 20). For instance, the phone 10 may change memory modes such as to reflect a different set of available stored phone numbers. As a further example, the phone 10 may enable certain operational features for one ambient acoustic environment and enable a different set for another ambient acoustic environment. This communication of the ambient acoustic environment sensed by the environmental sensor 80 to the phone 10 may require that an addition communications connection be made between the hands free adapter 50 and the phone 10 in some configurations.

The discussion above has used a cellular telephone 10 as an illustrative example. However, the present invention is not limited to cellular telephones; the invention encompasses any wireless communications device which may be coupled to a hands free adapter 50. Examples include personal communications devices, cordless phones, and two-way communicators such as two-way radio sets.

The present invention may, of course, be carried out in other specific ways than those herein set forth without departing from the spirit and essential characteristics of the invention. The present embodiments are, therefore, to be considered in all respects as illustrative and not restrictive, and all changes coming within the meaning and equivalency range of the appended claims are intended to be embraced therein.

What is claimed is:

1. A wireless communications assembly, comprising:

a) an environmental sensor for distinguishing between a plurality of different ambient acoustic environments;

b) an audio gain circuit in communication with said environmental sensor;

c) a hands free circuit in communication with said audio gain circuit;

d) a speaker in communication with said audio gain circuit;

e) a microphone in communication with said audio gain circuit;

f) wherein said audio gain circuit adjusts the audio characteristics of at least one of said microphone and said speaker depending on the ambient acoustic environment detected by said environmental sensor;

g) a hands free adapter including said environmental sensor;

h) a wireless communications device coupled to said hands free adapter, wherein the ambient acoustic environment detected by said environmental sensor is communicated to said wireless communications device, said wireless communications device changing operating modes depending on the ambient acoustic environment detected by said environmental sensor; and i) wherein said wireless communications device includes a plurality of groups of stored phone numbers and wherein the availability of said groups depends on the ambient acoustic environment detected by said environmental sensor.

2. A wireless communications assembly, comprising:

a) a wireless communications device having a hands free circuit and a transceiver for bi-directional communication; said hands free circuit having at least one hands free algorithm;

b) a hands free adapter attached to said wireless communications device and having:

i) an environmental sensor for distinguishing between a plurality of different ambient acoustic environments;

ii) an audio gain circuit in communication with said environmental sensor and said hands free circuit;

iii) a speaker in communication with said audio gain circuit;

iv) a microphone in communication with said audio gain circuit;

v) wherein said audio gain circuit includes memory; said memory having stored therein a plurality of audio gain settings for said audio gain circuit, each ambient acoustic environment being associated with one of said audio gain settings;

c) wherein said audio gain circuit adjusts the audio characteristics of at least one of said microphone and said speaker depending on the ambient acoustic environment detected by said environmental sensor to facilitate transmission of bi-directional conversation by said transceiver in said acoustic environment detected by said environmental sensor.

3. The assembly of claim 2 wherein said environmental sensor includes a plurality of external power connections and wherein each of said external power connections indicates a different ambient acoustic environment.

4. The assembly of claim 2 wherein said environmental sensor includes an ambient noise level detector.

5. The assembly of claim 2 wherein said environmental sensor includes a user settable switch.

6. The assembly of claim 2 wherein said environmental sensor detects the ambient acoustic environment based on a characteristic of said attachment between said wireless communications device and said hands free adapter.

7. The assembly of claim 2 wherein the ambient acoustic environment detected by said environmental sensor is communicated to said wireless communications device.

8. The assembly of claim 2 wherein said wireless communications device is a cellular telephone.

9. A method of adjusting the audio characteristics of a wireless communications assembly having an environmental sensor, a speaker, a microphone, and a audio gain circuit; said wireless communications assembly currently operating in one of a plurality of ambient acoustic environments, comprising:

identifying the current ambient acoustic environment via said environmental sensor;

communicating said identification to an audio gain circuit;

automatically adjusting, by said audio gain circuit, the audio characteristics of at least one of said microphone or said speaker based on said identification;

wherein said wireless communications assembly includes a wireless communications device and a hands free adapter;

wherein said hands free adapter includes said environmental sensor; and communicating said identification from said hands free adapter to said wireless communications device.

10. The method of claim 9 wherein said wireless communications device is a cellular telephone.

* * * * *